United States Patent [19]

Nagel et al.

[11] Patent Number: 4,544,110
[45] Date of Patent: Oct. 1, 1985

[54] APPARATUS FOR INTRODUCING STRIP-SHAPED MATERIAL INTO CASSETTES OR THE LIKE

[75] Inventors: Erich Nagel, Anzing; Leonhard Huber, Glonn; Günter Lammel, Eching, all of Fed. Rep. of Germany

[73] Assignee: Agfa-Gevaert Aktiengesellschaft, Leverkusen, Fed. Rep. of Germany

[21] Appl. No.: 417,889

[22] Filed: Sep. 14, 1982

[30] Foreign Application Priority Data

Dec. 30, 1981 [DE] Fed. Rep. of Germany ....... 3151956

[51] Int. Cl.⁴ ............................................ G03B 27/58
[52] U.S. Cl. ................... 242/67.1 R; 242/76; 242/195; 242/198
[58] Field of Search ............... 242/197, 198, 191, 195, 242/74, 71.1, 67.3 R, 67.1 R, 67.2, 76

[56] References Cited

U.S. PATENT DOCUMENTS 3,395,870  8/1968  Klinger ........................ 242/210 X
4,025,005  5/1977  Fleck et al. .................... 242/151 X
4,172,231 10/1979  d'Arc et al. ................... 242/191 X

FOREIGN PATENT DOCUMENTS 1187914  2/1965  Fed. Rep. of Germany .
2445259  4/1976  Fed. Rep. of Germany .
2617233 11/1977  Fed. Rep. of Germany .

Primary Examiner—Stuart S. Levy
Assistant Examiner—David Werner
Attorney, Agent, or Firm—Peter K. Kontler

[57] ABSTRACT

Apparatus for convoluting a web of photographic paper issuing from a copying machine onto a core of a cassette which is movable to a predetermined position with reference to the machine has an operating device which can deactivate the web catcher mechanism in the cassette in response to detection of adequate attachment of the leader of the web to the core. The catcher mechanism serves to guide the leader of the web into engagement with the core and is activated on movement of the cassette to its predetermined position. The circuit which monitors the engagement between the leader of the web and the core compares the peripheral speed of the core with that of a rotor which is installed in the machine and whose peripheral speed is lower than that of the core prior to completion of attachment of the web to the core. The operating device utilizes an electromagnet or an electric circuit whose condition is changed by the monitoring circuit when the attachment of the leader of the core is completed, and such change in condition initiates the deactivation of the catcher mechanism. The rotor advances the web toward the core during attachment of the leader to the core but is rotated by the web when the attachment is completed.

27 Claims, 6 Drawing Figures

APPARATUS FOR INTRODUCING STRIP-SHAPED MATERIAL INTO CASSETTES OR THE LIKE

BACKGROUND OF THE INVENTION

The present invention relates to apparatus for transporting strips, webs, bands, tapes or like flexible materials, especially for transporting photosensitive materials in and from a copying machine, such as a roll copier. More particularly, the invention relates to improvements in apparatus which can be utilized to transport freshly exposed photosensitive material from a copying machine into a cassette or an analogous receptacle, especially into a cassette which is equipped with means for automatically attaching the leader of photosensitive material to a rotary component in the form of a core whereon the material is convoluted and stored for transport to other processing stations.

It is already known to equip cassettes for exposed photographic paper or like photosensitive material (hereinafter called web for short) with a so-called catcher mechanism which is movable under or against the action of one or more springs in order to assume an operative position and to thus steer the leader of the web into the range of the rotating core. A copying machine which cooperates with such cassettes is normally equipped with means for terminating the activation of the catcher mechanism when the leader of the web is attached to the core; this is desirable and advantageous in order to ensure that the component parts of the catcher mechanism cannot interfere with accumulation of a requisite supply of convoluted web on the core. As a rule, the copying machine comprises a mechanism which advances the leader of the web toward and through an opening in the housing of the copying machine and thereupon into the interior of the cassette which comprises a catcher mechanism, normally a mechanism of the type having several mobile members in the form of arms which are pivotable or otherwise movable between operative and inoperative positions. When they assume the operative positions, such arms ensure that the leader of the web is guided toward and into contact with the rotating core. The arms have suitably configured portions which surround the core during threading of the leader into the interior of the cassette, and such movements of the arms can be effected in automatic response to proper positioning of the cassette with reference to the copying machine and/or vice versa. As soon as the first convolution or convolutions of the web properly adhere to the core, i.e., as soon as the core is capable of drawing the web into the interior of the cassette, the arms of the catcher mechanism should be retracted to allow for unimpeded accumulation of successive convolutions of the web on the core.

Catcher mechanisms of the just outlined type are disclosed, for example, in U.S. Pat. No. 3,395,870, German Pat. No. 1,187,914 and German Offenlegungsschrift No. 26 17 233. The Offenlegungsschrift discloses a catcher mechanism cooperating with a projection which is fixedly mounted on the copying machine and serves to activate (i.e., move to operative position) the catcher mechanism in an empty cassette which is about to receive a web of exposed photosensitive material. The projection must move the mobile parts of the catcher mechanism against the opposition of one or more springs which are installed in the casing of the cassette. The just discussed apparatus further comprises a discrete disengaging mechanism which must be activated as soon as the attachment of the leader of the web to the core of the cassette is completed in order to return the component parts of the catcher mechanism to their inoperative positions. The disengaging mechanism must be capable of performing such function in spite of the fact that the projection is rigidly connected to the copying machine, i.e., that the position of the projection cannot be changed on completion of the threading and attaching operations. To this end, the customary roll which is installed in the web-admitting opening in the casing of the cassette is coated with a friction lining which can entrain by friction a lever serving to trigger the operation of a linkage which, in turn, moves the component parts of the catcher mechanism to their inoperative positions. The lining can frictionally engage and pivot the aforementioned lever when the attachment of the leader of a web to the core in the casing of the cassette is completed. This is due to the fact that the web is supposed to be tensioned in response to proper attachment of its leader to the core of the cassette, and such tensioning of the web results in frictional engagement with the roll whose lining then pivots the lever with the result that the linkage initiates the movement of component parts of the catcher mechanism to their inoperative positions.

A drawback of the just discussed apparatus is that it is very prone to malfunction and is often likely to deactivate the catcher mechanism prior to completion of attachment of the leader of the web to the core in the interior of the cassette. If the extent of frictional engagement between the lever and the roll, at which the lever triggers the operation of the aforementioned linkage, is too low, deactivation of the catcher mechanism will be premature. On the other hand, if the selected friction is excessive, the catcher mechanism is likely to remain in operative position for an excessive interval of time and to thus interfere with winding of the web onto the core. Moreover, the mechanism which is disclosed in the German Offenlegungsschrift is quite complex and occupies a substantial amount of space.

OBJECTS AND SUMMARY OF THE INVENTION

An object of the invention is to provide a novel and improved apparatus which can effect reliable introduction of the leaders of webs of photosensitive material or the like into the casings of cassettes or analogous receptacles, and which can terminate the operation of the catcher mechanism in or on the cassette in a novel and improved way.

Another object of the invention is to provide novel and improved means for deactivating the catcher mechanism in the casing of a cassette for exposed photographic material or the like.

A further object of the invention is to provide a novel and improved copying machine which can be used in conjunction with cassettes of the type having catcher mechanisms for automatic attachment of the leaders of webs to their cores.

An additional object of the invention is to provide a novel and improved cassette for use in an apparatus of the above outlined character.

Still another object of the invention is to provide novel and improved means for detecting the completion of attachment of the leader of a web to a rotary core in a cassette or the like.

A further object of the invention is to provide an apparatus which can be utilized in conjunction with existing copying machines as a superior substitute for heretofore known apparatus serving to introduce the leaders of webs of photosensitive material or the like into successive cassettes and to attach such leaders to the cores in the casings of the cassettes.

An additional object of the invention is to provide the apparatus with novel and improved means for reducing the likelihood of premature or overly delayed deactivation of the catcher mechanism.

A further object of the invention is to provide a novel and improved method of initiating, carrying out and terminating the activation of a catcher mechanism in a cassette for the purpose of attaching the leader of a web or strip of photosensitive or like material to the rotary core of the cassette.

The invention resides in the provision of an apparatus for transporting a web, strip, band, tape or the like, particularly a web of photosensitive material, from a copying machine into a receptacle (e.g., a cassette) having a core or an analogous rotary web-collecting and storing component and a catcher mechanism which is activatable to direct the leader of the web into motion-receiving engagement with the rotary component. The apparatus comprises a signal-responsive operating device (such device can comprise an electromagnet) which is associated with (e.g., mounted in) the copying machine and can assume (or be imparted) first and second conditions (e.g., the energized and deenergized conditions of the aforementioned electromagnet) in which the operating device respectively activates and deactivates the catcher mechanism, and means for changing the condition of the operating device to thus initiate deactivation of the catcher mechanism. The condition changing means comprises means for scanning the progress of engagement between the leader of the web and the rotary component of the receptacle and for transmitting to the operating device signals in response to completion of engagement between the web and the rotary component. The catcher mechanism can comprise spring-biased arms or analogous pivotable or otherwise movable members movable by the operating device to operative positions in which the catcher mechanism is activated to steer the leader of the web toward engagement with the rotary component.

In accordance with one of the presently preferred embodiments of the invention, the operating device can comprise a two-armed lever, a reciprocable armature or an analogous projection which is provided on (e.g., in) the copying machine and is movable between first and second positions in which the operating device respectively assumes its first and second conditions. The projection can extend from the copying machine and can be mounted for pivotal movement between its first and second positions. The receptacle is preferably movable to and from a predetermined position (with reference to the copying machine and/or with reference to the operating device) in which the projection of the operating device activates the catcher mechanism as long as the projection assumes its first position (i.e., as long as the operating device assumes its first condition). The condition changing means can be designed to effect the movement of the projection to the second position, and the aforementioned mobile members assume their operative positions under the action of the projection while the latter is held in the first position and the receptacle dwells in its predetermined position. The catcher mechanism preferably further includes one or more coil springs and/or other suitable resilient means for moving the mobile members of the catcher mechanism to inoperative positions (i.e., to deactivate the catcher mechanism) in response to movement of the projection to its second position.

The operating device can further comprise a coil spring and/or other suitable resilient means for yieldably biasing the projection to its first position, and means for releasably locking the projection in its first position during threading of the web into and during engagement of the web with the rotary component of the receptacle. The locking means can comprise the aforementioned electromagnet which is energizable to lock the projection in its first position and is deenergized in response to a signal from the condition changing means to unlock the projection and to thus enable the projection to assume its second position as soon as the projection overcomes the resistance of the resilient means forming part of the operating device. This is preferably achieved in a fully automatic way under the action of the aforementioned resilient means forming part of the catcher mechanism, i.e., the resilient means of the catcher mechanism can automatically pivot or otherwise move the projection to its second position as soon as the locking means of the operating device becomes inactive and allows the resilient means of the catcher mechanism to overcome the bias of the resilient means of the operating device.

The projection can comprise cam means, and the catcher mechanism then comprises follower means which tracks the cam means in response to movement of the receptacle to its predetermined position with reference to the operating device to thereby activate the catcher mechanism. In such apparatus, the catcher mechanism can further comprise a wheel or an analogous rotary element which changes its angular position while the follower means tracks the cam means during movement of the receptacle to its predetermined position with reference to the operating device. The aforementioned mobile web-guiding members of the catcher mechanism are then arranged to assume their operative positions, in which the catcher mechanism is activated in response to rotation of the rotary element of the catcher mechanism, under the action of the cam and follower means. The just mentioned rotary element of the catcher mechanism is preferably installed in the interior of the receptacle, and the receptacle is then formed with an opening through which the projection of the operating device extends to move its cam means into engagement with the follower means of the catcher mechanism in response to movement of the receptacle to its predetermined position with reference to the operating device.

In accordance with a modification of the invention, the catcher mechanism can comprise a motion receiving member, e.g., a lever or a link which is articulately connected to the aforementioned rotary element of the catcher mechanism and is yieldably biased by the aforementioned spring or springs of the catcher mechanism. The operating device then comprises electromagnet means having a preferably reciprocable armature which is engageable with the motion receiving member of the catcher mechanism in energized condition of the electromagnet means to thereby displace the motion receiving member against the opposition of the spring or springs of the catcher mechanism and to thus activate the catcher mechanism in response to moving or placing of the receptacle to a predetermined position with reference to the operating device. The motion receiving member of the catcher mechanism can extend from the receptacle and into the copying machine, at least in deenergized condition of the electromagnet means, while the receptacle dwells in its predetermined position. The condition changing means then preferably comprises means for deenergizing the electromagnet means so that the armature is ready to be moved by the motion receiving member of the catcher mechanism under the action of the spring or springs forming part of the catcher mechanism, whereby the latter is deactivated and allows for unimpeded convolution of the web around the driven rotary component of the receptacle. The aforementioned wheel or an analogous rotary element of the catcher mechanism is articulately connected with and is turnable by the motion receiving member to activate the catcher mechanism in energized condition of the electromagnet means while the receptacle dwells in its predetermined position.

In accordance with a further embodiment of the invention, the catcher mechanism can comprise electric motor means (e.g., a rotary electromagnet) which is associated with the receptacle, and the operating device then comprises an electric circuit which is associated with the copying machine and serves to start the motor means in response to movement of the receptacle to a predetermined position with reference to the operating means. The electric circuit is responsive to the aforementioned signals to deenergize the electric motor means and to thus enable the spring or springs of the catcher mechanism to return the mobile members of the catcher mechanism to their inoperative positions, i.e., to deactivate the catcher mechanism.

The condition changing means can comprise a rotary element (such as a composite pulley or friction wheel forming part of a means for advancing the web from the interior of the copying machine into the receptacle) which is associated with the copying machine, first and second monitoring means (each such monitoring means can comprise a star wheel and a photocell) for respectively monitoring the peripheral speeds of the rotary component of the receptacle and the rotary element of the condition changing means, and means (e.g., a signal comparing stage in the form of an up/down counter or the like) for generating signals when the ratio of monitored speeds of the rotary component of the receptacle and the rotary element of the condition changing means is outside of a predetermined range. If the signal generating means is or comprises a signal comparing stage, the latter has first and second inputs which are connected with the respective monitoring means and an output which is connected with the operating device, e.g., through the medium of an amplifier in the form of a flip-flop or the like. The aforementioned rotary element of the condition changing means can comprise a shaft or another motor-driven member, a rotor which is engaged by the web, and a freewheel which is interposed between the motor-driven member and the rotor so that the rotor can be rotated by the motor-driven member when the speed of the web is below a predetermined value to thus advance the web toward the rotary component of the receptacle. The rotor is rotated by the web when the latter is already engaged by the rotary component of the receptacle and its peripheral speed exceeds the aforementioned value.

If the signal generating means comprises an up/down counter, its output can be arranged to transmit to the operating device signals when the monitored speed of the rotary element forming part of the condition changing means reaches a predetermined value. The first and second monitoring devices can be arranged to transmit first and second signals respectively denoting the peripheral speeds of the rotary component of the receptacle and of the rotary element of the condition changing means. The counter is then arranged to subtract the first signals from the second signals and to transmit to the operating device a signal when the number of counted second signals exceeds the number of first signals by a preselected value. The arrangement is preferably such that the number of first signals per unit of time matches the number of second signals prior to full engagement between the leader of the web and the rotary component of the receptacle, and that the peripheral speed of the rotary element forming part of the condition changing means increases in response to full engagement between the leader of the web and the rotary component of the receptacle so that the rotary component can draw the web into the receptacle.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
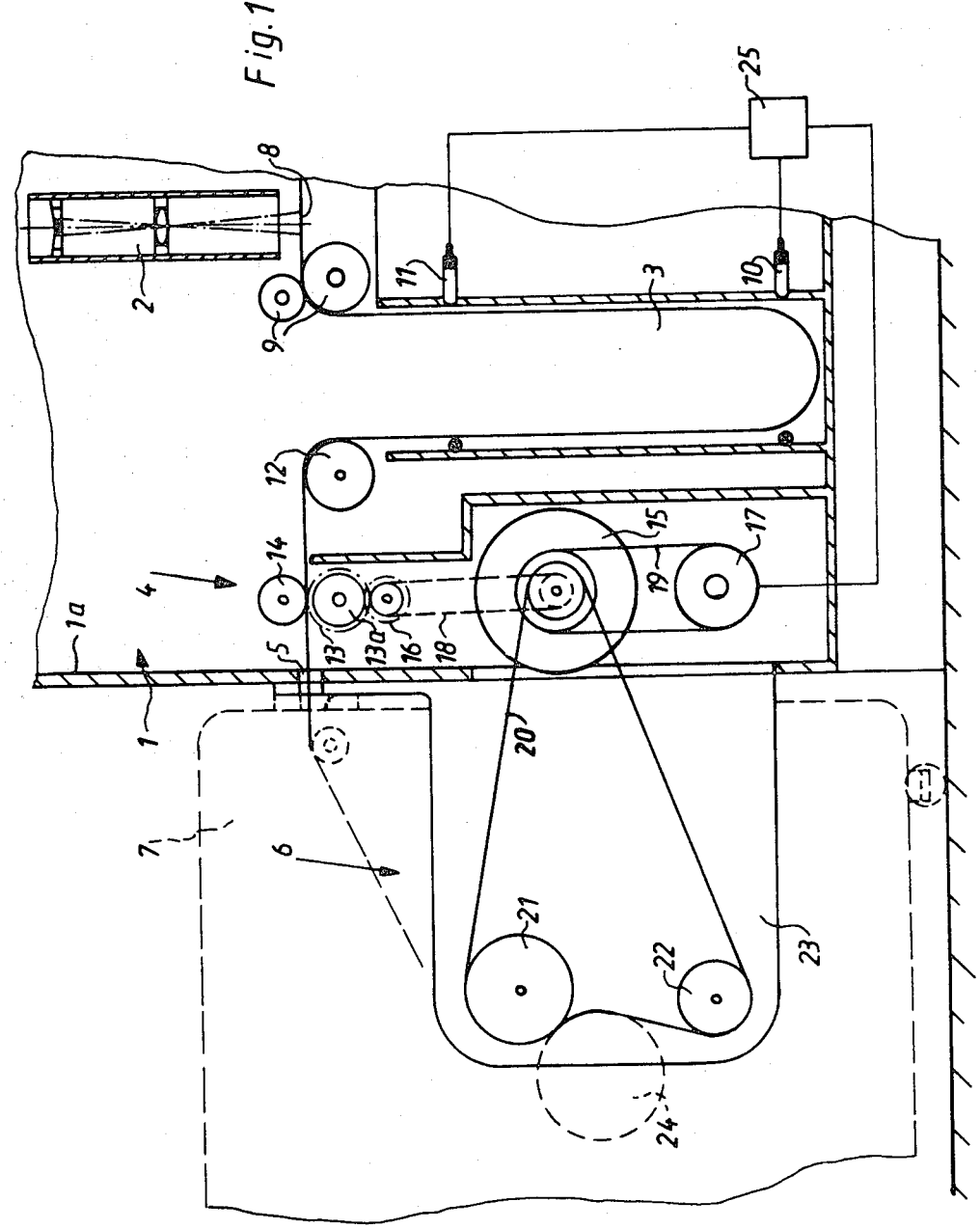
FIG. 1 is a fragmentary schematic vertical sectional view of a copying machine and a fragmentary elevational view of a cassette (the cassette is indicated by broken lines) which cooperate in accordance with a first embodiment of the present invention.

Referring to FIG. 1, there is shown a portion of a copying machine 1 including a copying station 2, a magazine 3 for storage of a loop of a web 8 of photographic paper, a transporting unit 4 for the web 8, a wall 1a with an opening 5 where the paper 8 issues from the copying machine, and a driving unit 6 for the rotary component or core 37 (FIGS. 2 and 3) of a receptacle here shown as a cassette 7 for reception and storage of convoluted photographic paper.

The heretofore described parts of the copying machine 1 operate in the customary way, i.e., the web 8 is exposed at the station 2 and thereupon passes between two deflecting rolls 9 to enter the magazine 3. The quantity of flexible material which is stored in the magazine 3 is monitored by a lower photocell 10, which generates a signal when the magazine 3 is filled or substantially filled, and an upper photocell 11 which generates a signal when the quantity of stored photosensitive material has been reduced to a minimum acceptable value. The web 8 thereupon advances over a further deflecting roll 12 and through the nip of two advancing rolls 13 and 14 (forming part of the transporting unit 4) on its way into and through the opening 5 in the wall 1a. The lower advancing roll 13 constitutes a rotary element of the condition changing means and is driven by a motor 17 through the medium of pulleys 15, 16 and endless belts 18, 19. The pulley 15 further drives an endless belt 20 which forms part of the driving unit 6; the latter further comprises two pulleys 21, 22 over which the belt 20 is trained. The pulleys 21 and 22 are mounted on a plate-like support 23 which is disposed outside of the housing of the copying machine 1 and is adjacent to a cassette 7 when the latter is properly positioned and oriented with reference to the copying machine 1. The cassette 7 has an externally mounted torque-receiving wheel 24 which is engaged by the belt 20 in the region between the pulleys 21 and 22 when the cassette 7 is moved to a predetermined position which is shown in FIG. 1. The wheel 24 can transmit torque to the core 37 of the cassette 7 so that such core is rotated by the motor 17 when the motor is on and the belt 20 is in satisfactory frictional engagement with the wheel 24.

The signal generating transducers of the photocells 10 and 11 are connected with the corresponding inputs of a control circuit 25 which is designed to start the motor 17 when the length of the looped web 8 in the magazine 3 extends all the way down between the light source and the transducer of the lower photocell 10, and which arrests the motor 17 when the quantity of photosensitive material in the magazine 3 is depleted to such an extent that the light source of the upper photocell 11 can transmit light to the associated transducer.

Figure 2:
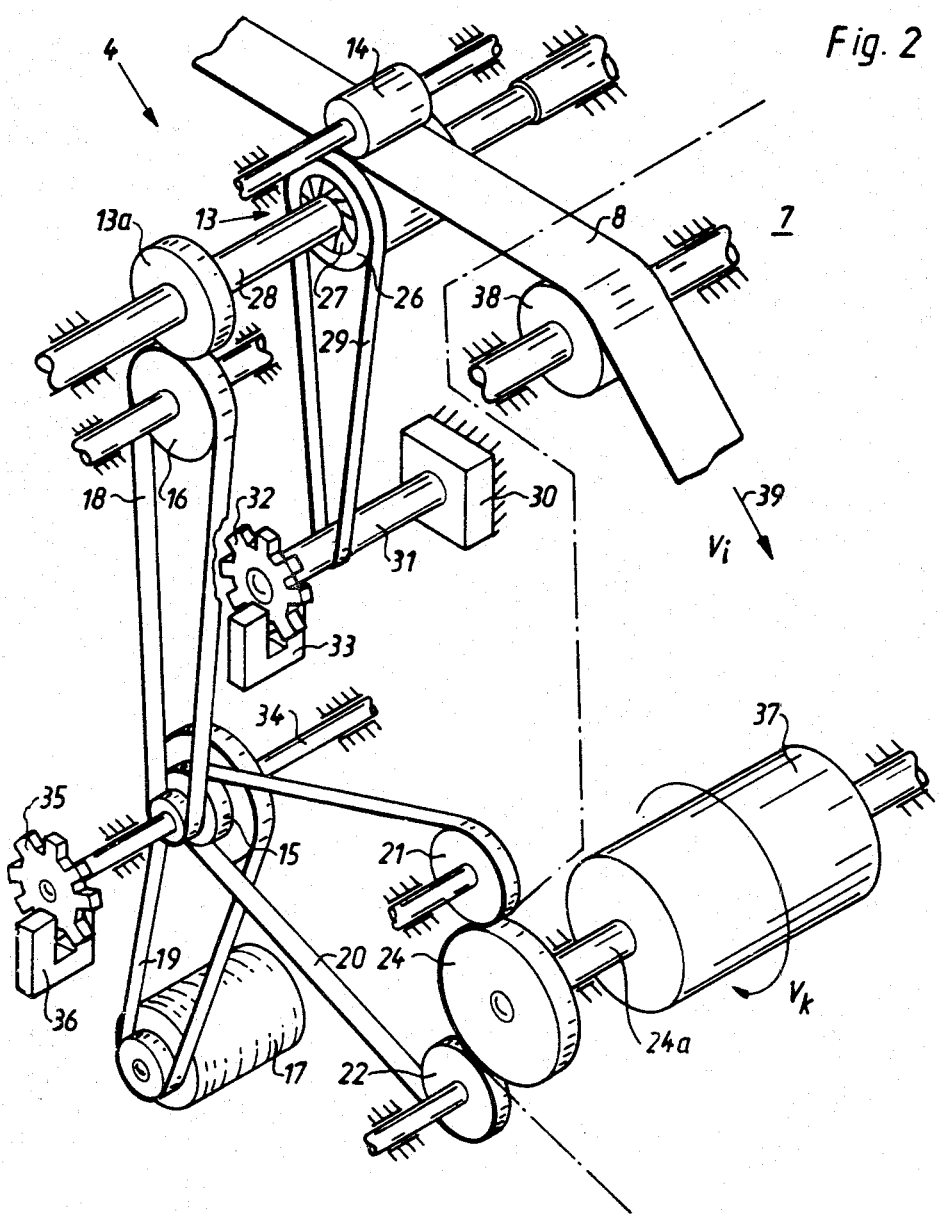
FIG. 2 is a perspective view of the driving unit for the material to be convoluted and for the core of the cassette.

The transporting unit 4 is shown in greater detail in FIG. 2 which further illustrates several elements of the structure shown in FIG. 1. The lower advancing roll 13 (rotary element of the condition changing means) comprises a hollow cylindrical rotor 26 whose internal surface is fixedly connected to the outer race of a bearing 27 constituting a freewheel and permitting the rotor 26 to rotate (in a clockwise direction, as viewed in FIG. 2) with reference to a motor-driven member or shaft 28 which is connected with the inner race of the freewheel 27. The latter can be of any conventional design, e.g., it can comprise a set of sprags which are installed between the inner and outer races. The inner race of the freewheel 27 is rigid with the shaft 28 which is journalled in the sidewalls of the copying machine 1 and carries a friction disc 13a which is staggered with reference to the rotor 26, as considered in the axial direction of the shaft 28. The wheel 13a is in frictional engagement with the external surface of the endless belt 18 which is trained over the pulleys 15 and 16.

A further endless belt 29 is trained over the rotor 26 of the advancing roll 13 in such a way that it is adjacent to the path of movement of the web 8 toward the opening 5 in the wall 1a of the copying machine 1. The purpose of the belt 29 is to drive the shaft 31 of a hysteresis brake 30. The shaft 31 carries a slotted star-like disc or star wheel 32 which cooperates with a photocell 33 so that the number of signals which are transmitted by the transducer of the photocell 33 per unit of time is a function of the RPM of the shaft 31 and hence a function of the peripheral speed of the rotor 26.

The hysteresis brake 30 acts upon the rotor 26, either continuously or for short intervals of time, so as to oppose rotation of the rotor 26 in a clockwise direction, as viewed in FIG. 2, and to thereby ensure that the web 8 is tightly convoluted on the core 37 of the cassette 7. The construction and mode of operation of a hysteresis brake which can be used in the apparatus of the present invention are disclosed, for example, in German Pat. No. 24 45 259 which corresponds to U.S. Pat. No. 4,025,005. The disclosure of U.S. Pat. No. 4,025,005 is incorporated herein by reference.

The pulley 15 is a composite body with several sections having different diameters. This pulley is connected to a shaft 34 which is rotatable in the housing of the copying machine 1 and carries a slotted star-like disc or star wheel 35 cooperating with a photocell 36 to generate signals denoting the speed of the motor 17 and the peripheral speed of the core 37. A smallest-diameter section of the pulley 15 drives the pulley 16 through the medium of the belt 18; a median-diameter section of the pulley 15 drives the belt 20 for the wheel 24 on the shaft of the core 37; and a maximum-diameter section of the pulley 15 receives torque from the motor 17 through the medium of the belt 19. The core 37 serves to convolute the web 8 therearound; to this end, the leader of the web 8 must be engaged by the core with assistance from a catcher mechanism the details of which are shown in FIG. 3 and whose purpose is to ensure that the leader of the web 8 is coiled about the core 37 until the frictional engagement between the material of the web and the core suffices to ensure that the core can draw the web into the cassette 7 when it receives torque from the motor 17 via belt 19, pulley 15, belt 20, wheel 24 and shaft 24a which is common to the wheel 24 and core 37.

Successive increments of the web 8 which enter the cassette 7 travel over a guide roll 38 in the direction which is indicated by arrow 39. Once the innermost convolution of the web 8 adequately adheres to the peripheral surface of the core 37, the aforementioned catcher mechanism is deactivated so that there is ample room for winding of a substantial quantity of photosensitive material onto the core 37. As a rule, a catcher mechanism comprises several mobile members in the form of arms which are moved close to the core 37 during guidance of the leader of the web and which are retracted away from the core as soon as the latter is capable of reliably drawing successive increments of the web 8 from the interior of the housing of the copying machine 1, through the opening 5, and into the interior of the cassette 7.

Figure 3:
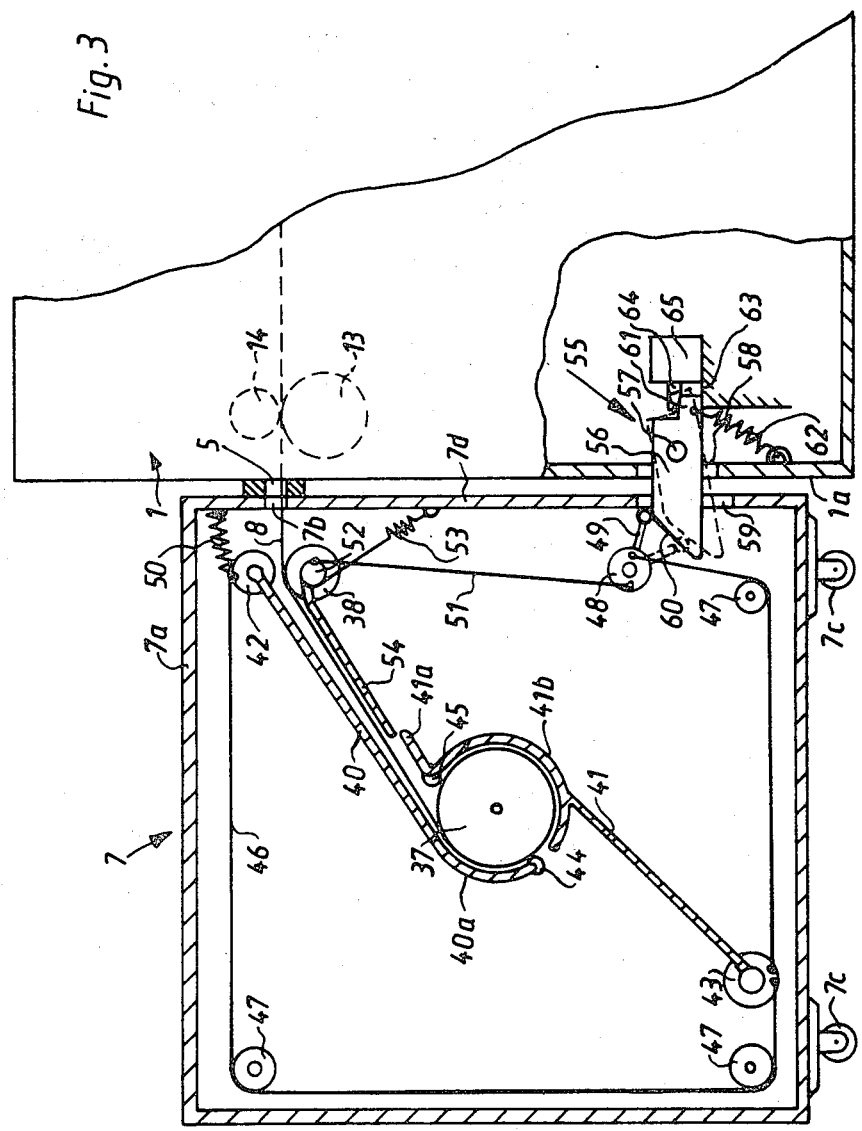
FIG. 3 is a vertical sectional view of the cassette and a fragmentary partly elevational and partly vertical sectional view of the copying machine.

Referring to FIG. 3, the receptacle or cassette 7 which is shown therein comprises a casing 7a confining the core 37 and the guide roll 38 and having an opening 7b movable into register with the opening 5 of the housing of the copying machine 1. The casing 7a is mounted on wheels 7c so that it can be readily manipulated to assume an optimum (predetermined) position for cooperation with the copying machine 1, i.e., for reception of a substantial supply of web 8 which is stored therein by being convoluted onto the core 37.

The casing 7a further accommodates the aforediscussed catcher mechanism one embodiment of which is shown in FIG. 3. The illustrated catcher mechanism comprises two movable material confining and guiding members or arms 40 and 41 which are respectively secured to and pivotable by discrete wheels 42 and 43 mounted in two corner regions of the casing 7a which are disposed diagonally opposite one another. The arm 40 has an arcuate inner portion 40a which can surround approximately one-fourth of the core 37 when the arm 40 assumes the operative position of FIG. 3. The other arm 41 includes a substantially semicylindrical inner portion or shell 41b which can surround approximately one-half of the core 37 when the arm 41 assumes the operative position of FIG. 3. The portions 40a and 41b of the arms 40 and 41 respectively carry small-diameter rollers 44 and 45 which can contact the peripheral surface of the core 37 to ensure that the arcuate portions 40a and 41b are held at a predetermined distance from the periphery of the core when the catching operation begins, i.e., when the leader of the web 8 begins to advance toward and to coil itself around the core 37. The arm 41 further comprises a straight extension 41a which bounds a portion of the underside of an elongated channel wherein the leader of the web 8 advances toward the core 37 when the arms 40 and 41 of the catcher mechanism assume the operative positions of FIG. 3. The remainder of the guide channel is defined by the major portion of the arm 40 which bounds the channel from above, and by a third arm or member 54 connected to and pivotable by a roll 52 which is coaxial with the guide roll 38. The guide roll 38 and the wheel 42 flank the inlet of the channel; they are rather closely adjacent to the opening 7b in the casing 7a of the cassette 7.

The means for pivoting the arms 40, 41 of the catcher mechanism between the illustrated (operative) and second (inoperative) positions comprises an elongated flexible element 46 (hereinafter called cable) one end portion of which is affixed to the periphery of the wheel 42 for the arm 40. The cable 46, which is trained over guide rolls 47 in the interior of the casing 7a, has an intermediate portion which is affixed to the periphery of the wheel 43 for the arm 41. The other end portion of the cable 46 is affixed to the periphery of a further rotary element or wheel 48 in the casing 7a. The guide rolls 47 are mounted in three corners of the casing 7a, and the rotary element or wheel 48 is installed in rather close proximity of that end wall (7d) of the casing 7a which is adjacent to the copying machine 1 when the cassette 7 assumes the predetermined web-receiving position of FIG. 3. The wheel 48 carries a substantially radially extending lever 49 which can be said to constitute a follower serving to track the inclined cam face 60 of a projection 56 which is pivotably installed in the housing of the copying machine 1. The casing 7a further accommodates a resilient element in the form of a coil spring 50 which tends to rotate the wheel 42 in a clockwise direction, as viewed in FIG. 3, and a second resilient element or coil spring 53 which tends to rotate the wheel 52 for the arm 54 in a counterclockwise direction, as viewed in FIG. 3. The spring 53 is attached to one end of a second flexible element (cable) 51 which is trained over the wheel 52 and the other end of which is attached to the periphery of the rotary element or wheel 48.

The projection 56 forms part of a signal-responsive operating device 55 for the catcher mechanism in the cassette 7. The purpose of the operating device 55 is to automatically move the arms 40, 41 and 54 of the catcher mechanism to the operative positions shown in FIG. 3 when the cassette 7 is moved to the predetermined position of FIG. 3, and to automatically effect a movement of arms 40, 41 and 54 to their inoperative or retracted positions when the attachment of the leader of the web 8 to the core 37 of the cassette 7 is completed, i.e., when the core 37 is capable of drawing photosensitive material into the casing 7a without any assistance from the catcher mechanism.

The projection 56 of the operating device 55 is a pivotable element which constitutes a two-armed lever. One arm of this projection extends outwardly through an opening 58 in the housing of the copying machine 1 and is provided with the aforementioned cam face 60 for the follower lever 49 of the rotary element of wheel 48. The other arm of the projection 56 constitutes a small protuberance 61 which is urged against a stop 63 in the housing of the copying machine 1 by a resilient element in the form of a coil spring 62. The projection 56 is pivotable on a horizontal pin 57, and its protuberance 61 can be releasably locked in the solid-line (first) position of FIG. 3 (i.e., in a position of abutment with the stop 63) by the armature or locking bolt 64 of a rotary electromagnet 65 in the housing of the copying machine 1. The casing 7a of the cassette 7 has an opening 59 which registers with the opening 58 in the wall 1a of the machine 1 when the cassette 7 is moved to the predetermined position of FIG. 3. The axis of the pivot 57 is parallel to the axis of the core 37 when the cassette 7 is held in the position of FIG. 3.

Figure 4:
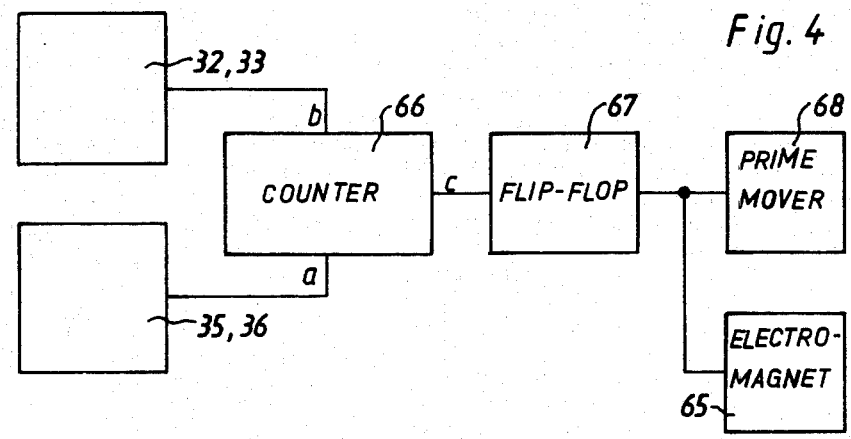
FIG. 4 is a circuit diagram of certain elements of the condition changing means which transmits signals to the operating device for the catcher mechanism in a cassette and which can also change the speed of the prime mover of the copying machine.

FIG. 4 illustrates a circuit which serves to change the condition of the operating device 55 and includes the photocells 33, 36 in the housing of the copying machine 1. The purpose is to cause the operating device 55 to deactivate the catcher mechanism in the cassette 7 when the leader of the web 8 is properly engaged by the core 37. The transducers of the photocells 33 and 36 transmit signals to the corresponding inputs b and a of a signal generating circuit 66 whose output c transmits signals to an operational amplifier 67, e.g., a conventional flip-flop circuit, whose output is connected with the rotary electromagnet 65 and with the variable-speed prime mover or motor 68 of the copying machine 1.

The parts 32, 33 can be said to constitute a means for monitoring the peripheral speed of the rotor 26, and the parts 35, 36 can be said to constitute a means for monitoring the peripheral speed of the rotary component or core 37 in the casing 7a of the cassette 7. The output c of the circuit 66 generates signals for transmission to the electromagnet 65 and to the prime mover 68 when the ratio of peripheral speeds of the rotor 26 and core 37 is outside of a predetermined range, preferably when the peripheral speed of the rotor 26 begins to equal the peripheral speed of the core 37.

The mode of operation of the apparatus which is shown in FIGS. 1 to 4 is as follows:

When no cassette is adjacent to the wall 1a of the housing of the copying machine 1, the projection 56 of the operating device 55 is held in the solid-line (first) position of FIG. 3. The projection 56 is urged to such position (of abutment with the stop 63) by the coil spring 62 and is releasably locked in such position by the armature 64 of the electromagnet 65. If the operator (or an automatic feeder) delivers an empty cassette 7 to the predetermined position of FIG. 3, the left-hand arm of the projection 56 enters the casing 7a via opening 59 and its cam face 60 pivots the follower lever 49 counterclockwise from the broken-line position to the solid-line position of FIG. 3. This causes the rotary element or wheel 48 to move the cables 46 and 51 lengthwise against the opposition of the respective coil springs 50 and 53 so that the arms 40 and 41 of the catcher mechanism are moved to the illustrated (operative) positions and the third arm 54 also assumes the operative position of FIG. 3. This ensures that, when the web 8 is caused to advance lengthwise, its leader advances in the channel which is defined by the parts 40, 41a and 54 and moves into frictional engagement with the peripheral surface of the core 37. The wheels 42 and 43 rotate counterclockwise, as viewed in FIG. 3, while the respective arms 40 and 41 move toward their operative positions, and the wheel 52 then rotates in a clockwise direction.

The operator or some automatic device selects the desired initial speed of the prime mover 68 of the copying machine 1, and the threading of the leader of the web 8 into the cassette 7 can begin as soon as the casing 7a assumes the predetermined position of FIG. 3. It is normally preferred to introduce the leader of the web 8 into the casing 7a while the copying machine 1 is operated at a relatively low speed. During introduction of the leader of the web 8 into the casing 7a, the peripheral speed of the core 37 exceeds the peripheral speed of the rotor 26 of the advancing roll 13. The leader enters the channel between the parts 40, 41a and 54 and progresses toward the core 37 which rotates and comes into requisite frictional engagement with the leader as a result of the action of rollers 44 and 45 which bias the leader against the external surface of the core.

As mentioned above, the peripheral speed of the core 37 exceeds the peripheral speed of the rotor 26 during introduction of the leader of the web 8 into the casing 7a. Once the leader of the web 8 adheres to the core 37 with a force which suffices to ensure that the core 37 can draw the web into the cassette 7, the core 37 continues to rotate at the same peripheral speed as in the course of the catching operation but the peripheral speed of the rotor 26 increases. This is possible because of the interposition of freewheel 27 between the rotor 26 and the motor-driven shaft 28. In other words, the peripheral speed of the rotor 26 then exceeds that speed at which the rotor would be driven were it to derive motion from the motor 17 via belt 19, pulley 15, belt 18, friction disc 13a and shaft 28. It will be noted that, once the leader of the web 8 is adequately attached to and the web is pulled by the core 37 in the casing 7a of the cassette 7, the peripheral speed of the rotor 26 matches that of the core 37. This is ascertained by the signal generating circuit 66 of FIG. 4. The output c of the circuit 66 then transmits a signal to the amplifier 67 which sets the prime mover 68 of the copying machine 1 for operation at the higher normal speed (since the leader of the web 8 is properly attached to the core 37) and which changes the condition of the rotary electromagnet 65 so that the latter disengages its armature 64 from the protuberance 61 of the projection 56 whereby the projection 56 assumes the broken-line (second) position of FIG. 3 because the bias of the springs 50 and 53 exceeds the bias of the spring 62. In other words, the protuberance 61 moves away from the stop 63 in the housing of the copying machine 1 and the rotary element or wheel 48 in the casing 7a can turn in a clockwise direction, as viewed in FIG. 3, to enable the cable 51 to return the arm 54 to its inoperative position via wheel 52. At the same time, the cable 46 causes the wheels 42 and 43 to retract the respective arms 40 and 41 to their inoperative positions and to thus provide around the core 37 ample room for reception and convolution of a substantial length of the web 8.

By properly selecting the transmission ratios and the diameters of the parts 13, 13a, 16, 15 and 31, as well as the number of slots in the wheels 32 and 35, one can readily ensure that the number of signals which are generated by the photocells 33 and 36 per second during threading of the leader of the web 8 into the cassette 7 is the same even though the peripheral speed of the core 37 then exceeds the peripheral speed of the rotor 26. In such apparatus, the circuit 66 can constitute an up/down counter serving to add up the signals which are generated by the photocell 33 but to subtract from such signals the signals which are generated by the photocell 36. In other words, the count of the circuit 66 is zero when the number of signals which the photocell 33 furnishes per unit of time matches the number of signals generated by the photocell 36 during the same unit of time.

However, once the core 37 properly engages the leader of the web 8 and begins to draw the web into the casing 7a without any assistance from the rotor 26, the peripheral speed of the rotor 26 increases, i.e., the rotor rotates faster than warranted by the RPM of the motor-driven shaft 28, and this results in a higher RPM of the shaft 31 and slotted disc 32, i.e., the number of signals which the photocell 33 transmits per unit of time increases above the number of signals which are generated by the photocell 36 during the same interval of time. The circuit (counter) 66 is set for a certain number of signals, i.e., when the number of signals transmitted by the photocell 33 exceeds the number of signals which are transmitted by the photocell 36 by a predetermined value, the output c of the circuit 66 transmits a signal to the amplifier 67 with the aforediscussed result, i.e., the speed of the prime mover 68 of the copying machine 1 is increased and the electromagnet 65 causes its armature 64 to release the projection 56 of the operating device 55 so that the arms 40, 41 and 54 of the catcher mechanism can reassume their inoperative positions, i.e., the catcher mechanism is deactivated.

When the core 37 accumulates a preselected number of convolutions, i.e., when the casing 7a accommodates a given length of the web 8, the cassette 7 is moved away from the position shown in FIG. 3 so that the follower lever 49 releases the left-hand arm of the projection 56 which returns to the solid-line (first) position of FIG. 3 under the action of the spring 62, i.e., the protuberance 61 again bears against the stop 62 and the armature 64 of the electromagnet 65 reassumes its locking position. The copying machine 1 is then ready to begin with introduction of exposed photosensitive material into the next cassette. The activation of the catcher mechanism in the next cassette is effected in a fully automatic way (by the locked projection 56) as soon as the next cassette assumes the position of the cassette 7 shown in FIG. 3.

Figure 5A:
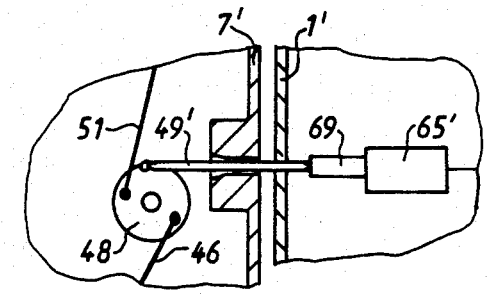
FIG. 5a is a fragmentary sectional view of a modified apparatus wherein the catcher mechanism is activated and deactivated in a different way.

FIG. 5a illustrates a modified operating device for the catcher mechanism in a cassette 7'. The follower lever 49 of FIG. 3 is replaced with a motion receiving member 49' which is pivoted to the rotary element or wheel 48 and extends from the casing of the cassette 7'. The housing of the copying machine 1' accommodates an operating device including an electromagnet 65' having a reciprocable projection or armature 69 which is contacted by the tip of the motion receiving member 49' when the cassette 7' is properly positioned with reference to the copying machine 1'. The electromagnet 65' is normally energized, and its armature 69 is then held in extended position. As the cassette 7' moves toward the predetermined position of FIG. 5a, the extended armature 69 depresses the member 49' which thereby rotates the wheel 48 in a counterclockwise direction and to the angular position which is shown in FIG. 5a. In such angular position, the arms of the catcher mechanism (not specifically shown) in the casing of the cassette 7' assume their operative positions corresponding to those of the arms 40, 41 and 54 shown in FIG. 3. The catcher mechanism remains activated until the condition changing circuit of the apparatus (e.g., a circuit corresponding to that shown in FIG. 4) generates a signal (such signal is transmitted from the output c of the counter 66 to the amplifier 67) denoting that the attachment of the leader of the web to the core of the cassette 7' is completed. Such signal causes the amplifier 67 to change the condition of the electromagnet 65' which retracts its armature 69 or allows the member 49' to depress the armature 69 under the action of the aforediscussed springs 50 and 53 in the cassette 7'. The wheel 48 rotates in a clockwise direction and this entails a movement of the mobile parts of the catcher mechanism in the cassette 7' to their inoperative or retracted positions. The electromagnet 65' is energized again after the loaded cassette 7' is removed but before (or not later than when) the cassette 7' is replaced with a fresh (empty) cassette. The member 49' extends into the housing of the copying machine 1', at least in retracted position of the armature 69.

Figure 5B:
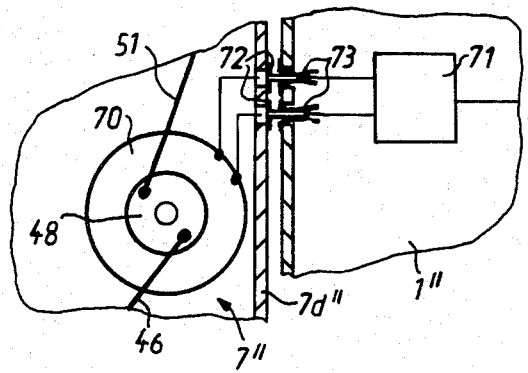
FIG. 5b is a similar fragmentary sectional view of a third apparatus wherein the catcher mechanism comprises an electromagnet capable of moving the mobile members of the catcher mechanism to their operative and inoperative positions.

FIG. 5b illustrates a further embodiment of the operating device which can be used in lieu of the operating device 55 shown in FIG. 3 or the operating device 65' shown in FIG. 5a. The catcher mechanism in the cassette 7" is modified to the extent that the rotary element or wheel 48 for the cables 46 and 51 is connected with an electric motor here shown as a rotary electromagnet 70 which is electrically connected with two male contacts 72 extending from the wall 7d" of the casing of the cassette 7". The housing of the copying machine 1" carries two female contacts or sockets 73 which receive the corresponding male contacts 72 as soon as the cassette 7" assumes the predetermined position of FIG. 5b. The female contacts 73 are connected with an electric circuit (operating device) 71 via conductors in the interior of the copying machine 1". When the condition changing means of the apparatus including the structure of FIG. 5b generates a signal denoting that the core in the casing of the cassette 7" is in requisite engagement with the leader of a web, the control circuit 71 (corresponding to the electromagnet 65') effects a deenergization of the electromagnet 70 which rotates the wheel 48 (or allows the wheel 48 to rotate) in a direction to deactivate the catcher mechanism in the casing of the cassette 7". The arrangement is such that the electromagnet 70 is energized as soon as the cassette 7" assumes its predetermined position whereby the electromagnet 70 activates the catcher mechanism in the cassette 7".

An important advantage of the improved apparatus is that there is no need to provide the receptacle 7, 7' or 7" with a disengaging unit or mechanism which deactivates the catcher mechanism in response to proper engagement between the leader of the web 8 and the rotary component (core) 37 of the receptacle. Thus, all that is necessary is to change the condition of the operating device 55, 65' or 71 whereby the operating device automatically deactivates the catcher mechanism. In other words, the device (55, 65' or 71) which activates the catcher mechanism, preferably in automatic response to movement of the receptacle 7, 7' or 7" to the illustrated predetermined position with reference to the operating device, also serves to deactivate the catcher mechanism by the simple expedient of changing the condition of the operating device in response to signals from the element 67 of the condition changing means shown in FIG. 4 or analogous condition changing means. The illustrated condition changing means is designed to compare the peripheral speeds of the rotary component 37 of the receptacle and the rotary element 13 (actually the rotor 26 of the element 13) and to change the condition of the operating device (with a view to deactivate the catcher mechanism) when the ratio of such peripheral speeds is outside of a predetermined range. As explained above, the peripheral speed of the rotor 26 is less than the peripheral speed of the rotary component 37 during movement of the leader of the web 8 into adequate engagement with the component 37. However, once such engagement has taken place, the peripheral speed of the rotor 26 increases to match the peripheral speed of the rotary component 37 because the rotor is then driven by the web 8 (rather than by the motor-driven shaft 28 of the rotary element 13) whereby the number of signals which are generated by the respective monitoring means 32, 33 per unit of time exceeds the number of signals which are generated by the means (35, 36) for monitoring the peripheral speed of the rotary component 37. When the number of monitored signals which reach the input b of the counter 66 exceeds the number of signals which are transmitted to the input a of the counter 66 during the same interval of time, the output c of the counter transmits a signal which changes the condition of the operating device 55, 65' or 71.

It is clear that each cassette is provided with suitable sealing means to prevent penetration of light into its casing. Such sealing means seals the opening which registers with the opening 5 as well as the opening 59 of the casing 7a shown in FIG. 3, and also the corresponding openings of the cassettes 7' and 7". If desired, the entire driving unit (the unit 6 of FIGS. 1 and 2) can be accommodated in a separate chamber or externally of the cassette, and the arms (40, 41 and 54) of the catcher mechanism are then mounted on shafts which extend through the partition between the separate chamber and the interior of the casing of the cassette or through a wall of the casing itself. All such and other modifications, which will readily occur to men having requisite skill in this art, are intended to be within the purview of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for transporting a web, particularly a web of photosensitive material, from a copying machine into a receptacle having a rotary component; and a catcher mechanism activatable to direct the leader of the web into engagement with the rotary component, comprising a signal-responsive operating device associated with the copying machine and arranged to assume first and second conditions in which said device respectively activates and deactivates the catcher mechanism, said operating device comprising a projection provided on the copying machine and movable between first and second positions in which said operating device respectively assumes said first and second conditions, the receptacle being movable to and from a predetermined position in which said operating device activates the catcher mechanism as long as said operating device remains in said first condition; and means for changing the condition of said operating device to thus initiate deactivation of the catcher mechanism, comprising means for scanning the progress of engagement between the web and the rotary component, and for transmitting signals to said device in response to completion of engagement between the web and the rotary component.

2. The apparatus of claim 1, wherein the catcher mechanism comprises spring-biased members movable by said operating device to operative positions in which the catcher mechanism is activated and in which the spring-biased members direct the leader of the web toward engagement with the rotary component of the receptacle.

3. The apparatus of claim 1 wherein said projection extends from the copying machine and is pivotable between the first and second positions thereof.

4. Apparatus for transporting a web, particularly a web of photosensitive material, from a copying machine into a receptacle having a rotary component, and a catcher mechanism activatable to direct the leader of the web into engagement with the rotary component, comprising a signal-responsive operating device associated with the copying machine and arranged to assume first and second conditions in which said device respectively activates and deactivates the catcher mechanism; and means for changing the condition of said operating device to thus initiate deactivation of the catcher mechanism, said condition changing means including a rotary element which is associated with the copying machine and is arranged to be driven by the web at least when the speed of the latter exceeds a preselected magnitude, monitoring means for monitoring the rotational speeds of the rotary component and said rotary element, and means for transmitting signals to said device when the rotational speed of said rotary element relative to the rotational speed of the rotary component reaches a predetermined value.

5. The apparatus of claim 4, wherein a drive for said rotary element is associated with the copying machine, the receptacle being movable to and from a predetermined position in which said operating device activates the catcher mechanism as long as said operating device remains in said first condition, and the receptacle and the drive being designed to permit driving engagement between the latter and the rotary component when the receptacle is in its predetermined position.

6. The apparatus of claim 4, wherein the catcher mechanism comprises a motion receiving member and resilient means for yieldably biasing the motion receiving member, said operating device comprising electromagnet means having an armature engageable with the motion receiving member in energized condition of said electromagnet means to thereby displace the motion receiving member against the opposition of said resilient means and to thus activate the catcher mechanism in response to placing of the receptacle in a predetermined position with reference to said electromagnet means.

7. The apparatus of claim 6, wherein the motion receiving member of the catcher mechanism extends from the receptacle and into the copying machine, at least in the deenergized condition of said electromagnet means, while the receptacle dwells in said predetermined position.

8. The apparatus of claim 6, wherein said condition changing means includes means for deenergizing said electromagnet means so that said armature is ready to be moved by the motion receiving member under the action of said resilient means.

9. The apparatus of claim 8, wherein the catcher mechanism further comprises a rotary element turnable by said motion receiving member to thereby activate the catcher mechanism in energized condition of said electromagnet means while the receptacle dwells in said predetermined position.

10. The apparatus of claim 9, wherein the rotary element of the catcher mechanism is articulately connected with said motion receiving member.

11. The apparatus of claim 4, wherein the catcher mechanism comprises electric motor means associated with the receptacle and said operating device comprises an electric circuit associated with the copying machine and arranged to start the motor means in response to movement of the receptacle to a predetermined position with reference to said operating device.

12. The apparatus of claim 11, wherein the motor means includes a rotary electromagnet.

13. The apparatus of claim 11, wherein said circuit is responsive to said signals to deenergize said electric motor means.

14. Apparatus for transporting a web, particularly a web of photosensitive material, from a copying machine into a receptacle having a rotary component, and a catcher mechanism activatable to direct the leader of the web into engagement with the rotary component, comprising a signal-responsive operating device associated with the copying machine and arranged to assume first and second conditions in which said device respectively activates and deactivates the catcher mechanism, said operating device including a projection provided on the copying machine and movable between first and second positions in which said operating device respectively assumes said first and second conditions, and the receptacle being movable to and from a predetermined position in which said projection activates the catcher mechanism as long as said projection remains in the first position thereof, the catcher mechanism comprising a plurality of mobile members arranged to assume operative positions under the action of said projection while the latter is held in said first position and the receptacle dwells in said predetermined position, and the catcher mechanism further including resilient means for moving the mobile members to inoperative positions in response to movement of said projection to said second position; and means for changing the condition of said operating device to thus initiate deactivation of the catcher mechanism, comprising means for scanning the progress of engagement between the web and the rotary component, and for transmitting signals to said device in response to completion of engagement between the web and the rotary component, said condition changing means being operative to effect movement of said projection to said second position.

15. Apparatus for transporting a web, particularly a web of photosensitive material, from a copying machine into a receptacle having a rotary component, and a catcher mechanism activatable to direct the leader of the web into engagement with the rotary component, comprising a signal-responsive operating device associated with the copying machine and arranged to assume first and second conditions in which said device respectively activates and deactivates the catcher mechanism, said operating device including a projection provided on the copying machine and movable between first and second positions in which said operating device respectively assumes said first and second conditions, and said operating device further comprising resilient means for yieldably biasing said projection to said first position, and means for releasably locking said projection in said first position; and means for changing the condition of said operating device to thus initiate deactivation of the catcher mechanism, comprising means for scanning the progress of engagement between the web and the rotary component, and for transmitting signals to said device in response to completion of element between the web and the rotary component.

16. The apparatus of claim 15, wherein said locking means comprises electromagnet means which is energizable to lock said projection in the first position and is deenergized in response to said signals to unlock said projection and thereby enable the latter to assume said second position on overcoming the bias of said resilient means.

17. The apparatus of claim 16, wherein the catcher mechanism comprises means for automatically moving said projection to second position in response to deenergization of said electromagnet means.

18. Apparatus for transporting a web, particularly a web of photosensitive msterial, from a copying machine into a receptacle having a rotary component, and a catcher mechanism activatable to direct the leader of the web into engagement with the rotary component, comprising a signal-responsive operating device associated with the copying machine and arranged to assume first and second conditions in which said device respectively activates and deactivates the catcher mechanism, said operating device including a projection providing on the copying machine and movable between first and second positions in which said operating device respectively assumes said first and second conditions, and said projection comprising cam means, the catcher mechansim including follower means which tracks the cam means in response to movement of the receptacle to a predetermined position with reference to said operating device to thereby activate the catcher mechanism; and means for changing the condition of said operating device to thus initiate deactivation of the catcher mechanism, comprising means for scanning the progress of engagement between the web and the rotary component, and for transmitting signals to said device in response to completion of engagement between the web and the rotary component.

19. The apparatus of claim 18, wherein the catcher mechanism further comprises a rotary element which changes its angular position while said follower means tracks said cam means during movement of the receptacle to said predetermined position, and web-guiding members arranged to move to operative positions in which the catcher mechanism is activated in response to rotation of said rotary element under the action of said cam means.

20. The apparatus of claim 19, wherein the rotary element of the catcher mechanism is installed in the interior of the receptacle and the receptacle has an opening through which the projection of the operating device penetrates to move its cam means into engagement with the follower means in response to movement of thereceptacle to said predetermined position.

21. Apparatus for transporting a web, particularly a web of photosensitive material, from a copying machine into a receptacle having a rotary component, and a catcher mechanism activatable to direct the leader of the web into engagement with the rotary component, comprising a signal-responsive operating device associated with the copying machine and arranged to assume first and second conditions in which said device respectively activates and deactivates the catcher mechanism; and means for changing the condition of said operating device to thus initiate deactivation of the catcher mechanism, comprising means for scanning the progress of engagement between the web and the rotary component, and for transmitting signals to said device in response to completion of engagement between the web and the rotary component, said condition changing means including a rotary element associated with the copying machine, first and second monitoring means for respectively monitoring the peripheral speeds of the rotary component and said rotary element, and means for generating said signals when the ratio of the monitored speeds of the rotary component and said rotary element is outside of a predetermined range, said rotary element comprising a motor-driven member, a rotor which is engaged by the web, and a freewheel interposed between said motor-driven member and said rotor so that the latter can be rotated by said motor-driven member when the speed of the web is below a predetermined value to thereby advance the web toward the rotary component of the receptacle, said rotor being rotated by the web when the latter is engaged by the rotary component of the receptacle and its speed exceeds said value.

22. Apparatus for transporting a web, particularly a web of photosensitive material, from a copying machine into a receptacle having a rotary component, and a catcher mechanism activatable to direct the leader of the web into engagement with the rotary component, comprising a signal-responsive operating device associated with the copying machine and arranged to assume first and second conditions in which said device respectively activates and deactivates the catcher mechanism; and means for changing the condition of said operating device to thus intiate deactivation of the catcher mechanism, comprising means for scanning the progress of engagement between the web and the rotary component, and for transmitting signals to said device in response to completion of engagement between the web snd the rotary component, said condition changing means including a rotary element associated with the copying machine, first and second monitoring means for respectively monitoring the peripheral speeds of the rotary component and said rotary element, and means for generating said signals when the ratio of the monitored speeds of the rotary component and said rotary element is outside of a predetermined range, said signal generating means comprising an up-down counter having first and second inputs connected with the respective monitoring means, and an output arranged to transmit said signals to said operating device when the monitored speed of said rotary element reaches a predetermined value, said monitoring means being arranged to transmit first and second signals respectively denoting the peripheral speeds of the rotary component and of said rotary element, and said counter being arranged to subtract the first signals from the second signals and to transmit a signal to said operating device when the number of second signals exceeds the number of first signals by a preselected value.

23. The apparatus of claim 22, wherein said condition changing means further comprises a flip-flop interposed between the output of said counter and said operating device.

24. The apparatus of claim 22, wherein the number of said first signals per unit of time matches the number of said second signals prior to full engagement between the leader of the web and the rotary component of the receptacle, and the peripheral speed of the rotary element increases in response to full engagement between such leader and the rotary component so that the latter can draw the web into the receptacle.

25. Apparatus for transporting a web, particularly a web of photosensitive material, from a copying machine into a receptacle having a rotary component, and a catcher mechanism activatable to direct the leader of the web into engagement with the rotary component, comprising a signal-responsive operating device associated with the copying machine and arranged to assume first and second conditions in which said device respectively activates and deactivates the catcher mechanism, the receptacle being movable to and from a predetermined position in which said operating device activates the catcher mechanism as long as said operating device remains in said first condition; and means for changing the condition of said operating device to thus initiate deactivation of the catcher mechanism, comprising means for scanning the progress of engagement between the web and the rotary component, and for transmitting signals to said device in response to completion of engagement between the web and the rotary component, said condition changing means further comprising a rotary element associated with the copying machine and said scanning means comprising first and second monitoring means for respectively monitoring the peripheral speeds of the rotary component and said rotary element, and means for generating said signals when the ratio of monitored speeds of the rotary component and said rotary element is outside of a predetermined range.

26. The apparatus of claim 25, wherein said signal generating means includes a signal comparing stage having first and second inputs connected with the respective monitoring means and an output, and amplifier means connecting said output with said operating device.

27. The apparatus of claim 25, wherein said signal generating means comprises an up/down counter having first and second inputs connected with the respective monitoring means and an output arranged to transmit said signals to said operating device when the monitored speed of said rotary element reaches a predetermined value.

* * * * *